Feb. 10, 1970    M. T. SOKOLOSKY    3,494,183
LENGTH AND WEIGHT INDICATING MECHANISM FOR CABLE APPARATUS
Filed Oct. 18, 1967    2 Sheets-Sheet 1

Martin T. Sokolosky
INVENTOR.

BY Charles E. Lightfoot
ATTORNEY

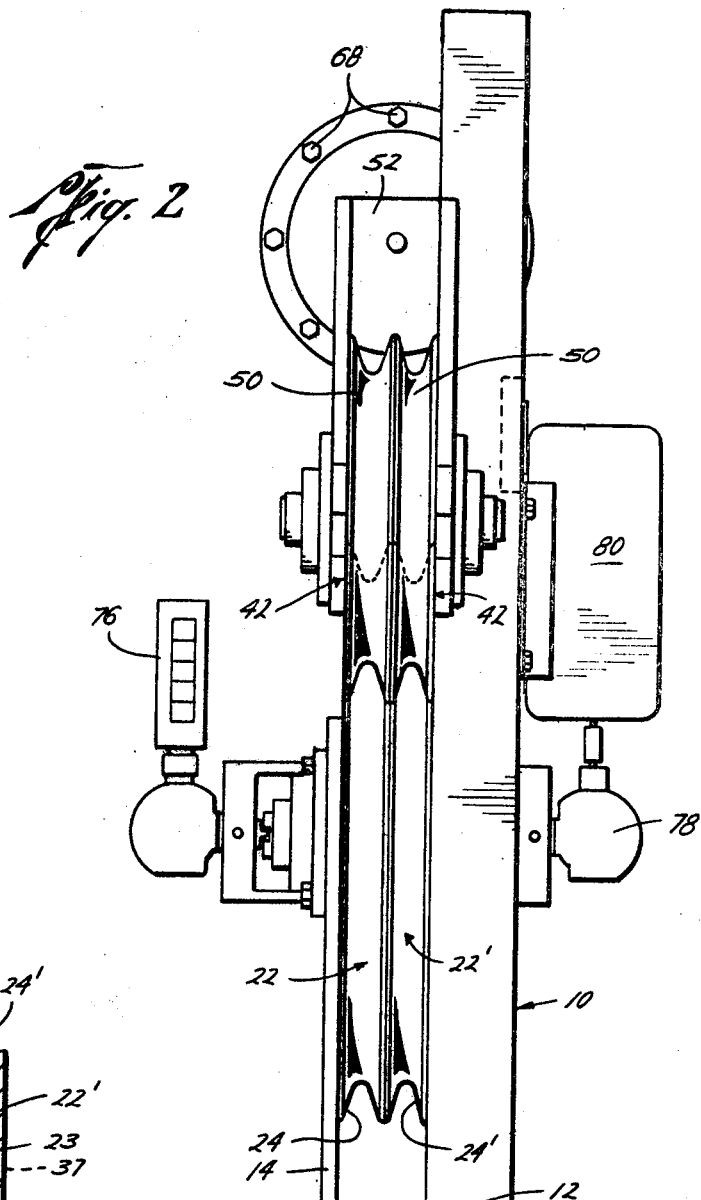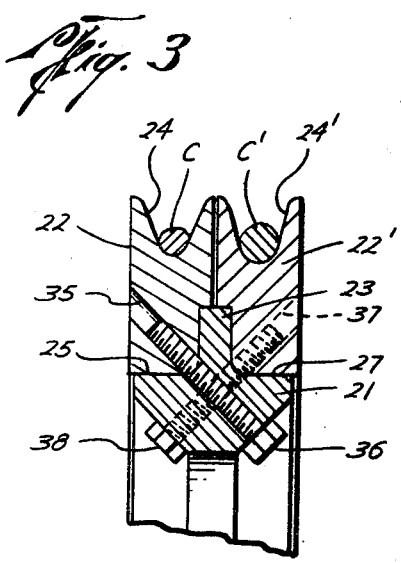
Martin T. Sokolosky
INVENTOR.
BY Charles E. Lightfoot
ATTORNEY

United States Patent Office 3,494,183
Patented Feb. 10, 1970

---

3,494,183
LENGTH AND WEIGHT INDICATED MECHANISM FOR CABLE APPARATUS
Martin T. Sokolosky, 3703 Underwood,
Houston, Tex. 77025
Continuation-in-part of application Ser. No. 609,569,
Jan. 16, 1967. This application Oct. 18, 1967, Ser.
No. 676,175
Int. Cl. G01l 5/08
U.S. Cl. 73—144                5 Claims

ABSTRACT OF THE DISCLOSURE

Length and weight indicating mechanism of the grooved wheel type for cable apparatus by which the length of a cable which is paid out or reeled in may be accurately determined, including means adapting the mechanism for use with cables of different diameters and means for adjusting the mechanism for inaccuracies due to wear or other causes. The mechanism also includes weight or tension indicating means by which the weight carried by or pull exerted on the cable may be determined.

---

This application is a continuation-in-part of a previous copending application filed by the same applicant on Jan. 16, 1967, under Ser. No. 609,569, now Patent 3,411,350, issued Nov. 19, 1968.

As heretofore commonly constructed, cable length and weight indicating mechanism of the wheel type customarily includes a peripherally grooved wheel over which the cable passes to cause the wheel to rotate as the cable is reeled in or paid out, the circumference of the wheel being predetermined to accurately measure the length of the cable.

In order to assure accuracy of measurement in mechanism of this type, the wheel is ordinarily designed for use with only one size of cable and the cable is fitted closely to the groove in contact with the bottom of the groove. The wheel is constructed to measure the cable with reference to the center of the cable, so that the accuracy of the length measurement may be substantially effected by wear on the cable, or by the use of a cable of a different size than that for which the wheel is designed. For this reason a separate wheel is necessary for each different diameter of cable employed, and the wheel must be changed each time that a different cable is to be used.

Moreover, wear on the cable, resulting in a relatively slight change in its effective diameter may cause substantial variation in the length measurement, so that means must be provided for adjusting the wheel to compensate for such wear and to allow the wheel to be readjusted for the variation resulting from the substitution of a new cable after the wheel has been adjusted for use with a worn one.

Cable measuring mechanism of this kind is also frequently provided with weight or tension indicating means, which may take the form of pulleys movably supported for movement toward and away from the measuring wheel and yieldable means positioned for coaction with the pulleys to yieldingly urge the pulleys toward the wheel and with which the cable is engaged at longitudinally spaced locations thereon, to hold the cable in a flexed condition in engagement with the wheel, so that the pulley will be moved away from the wheel in response to an increase in the pull exerted on the cable. Means is provided for coaction with the pulleys in response to movements of the pulleys toward and away from the measuring wheel to indicate variations in the weight or tension on the cable.

The present invention has for an important object the provision of length and weight measuring mechanism for cable apparatus having means which is adapted for use interchangeably with cables of different diameters.

Another object of the invention is to provide cable length and tension measuring mechanism of the measuring wheel type embodying a measuring wheel for use with cables of different diameters and including means for facilitating the rapid changing of the cables employed therewith.

A further object of the invention is the provision in cable length and tension mechanism of the kind referred to of cable measuring wheel means embodying means for varying the effective diameter thereof to adjust the accuracy of length measurement of the mechanism.

Another object of the invention is to provide tension indicating means for cable tension measuring mechanism which is hydraulically operated and which is adjustable for accuracy of measurement.

Briefly described the cable length and weight measuring mechanism of the invention comprises a rotatably mounted measuring wheel having a plurality of interchangeable, peripherally grooved, cable engaging rim portions, each of which is designed for use with a different size of cable, rotatable pulleys for each such rim portion which are movably mounted for swinging movement in the plane of the rim portion with which they are associated for bodily movement in engagement with a cable at locations to hold the cable in a flexed condition in engagement in the groove of such rim portion, and yieldable means positioned for coaction with the pulleys of each pair of yieldingly urge the pulleys toward the wheel. The mechanism also includes indicator means responsive to the bodily movements of the pulleys in response to variations in the pull exerted on the cable to indicate the weight or tension on the cable. The length measuring means of the mechanism includes means for indicating the amount of rotational movement of the measuring wheel.

The objects and advantages of the invention may best be understood from the following detailed description constituting a specification of the same, when considered in conjunction with the annexed drawings, wherein—

FIGURE 2 is an end elevational view of the same; and

FIGURE 3 is a fragmentary, radial, cross-sectional view, on a somewhat enlarged scale, of the rim portion of the measuring wheel of the mechanism, showing details of construction of the same and illustrating the manner in which the adjustable rim portions are mounted on the wheel.

Figure 1:
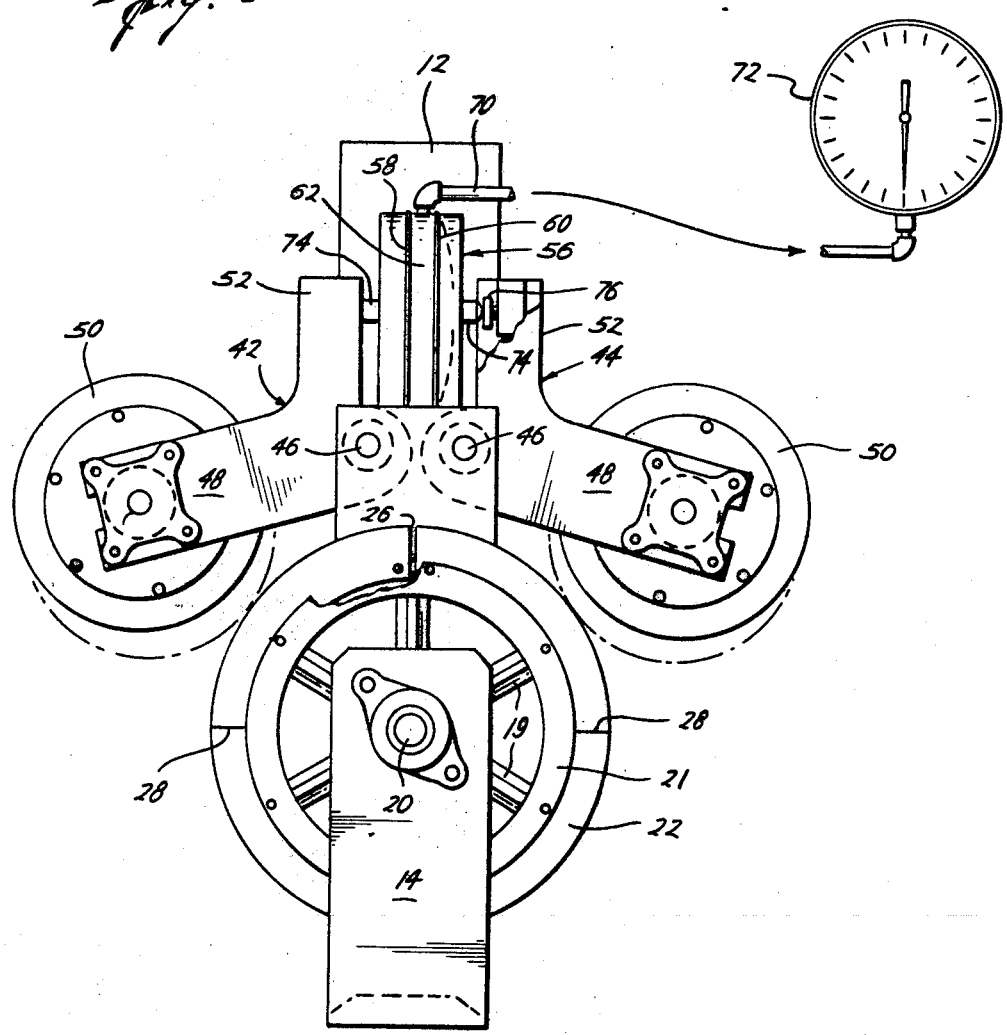
FIGURE 1 is a side elevational view of a preferred embodiment of the mechanism of the invention.

Referring now to the drawings in greater detail, the length and weight indicating mechanism, as illustrated herein includes a supporting frame 10, of rigid construction having a base portion 12 and a support arm 14 located in parallel, spaced relation to the base and connected thereto by a bottom portion 16 to form a generally U-shaped structure, of which the base 10 is the longer arm.

A measuring wheel is rotatably mounted on a shaft 20 extending between and supported on the free end portion of the arm 14 and on the base 12. This wheel may be of a convenient construction having radial spokes 19, and an inner rim portion 21 formed with a central, peripheral, radially outwardly extending boss or flange 23, forming peripheral, cylindrical, outwardly facing shoulders or faces 25 and 27 disposed at each side of the central flange 23.

A removable outer rim member 22 is releasably mounted on the peripheral shoulder 25, and a similar rim 22' is likewise mounted on the shoulder 27, as best seen in FIGURE 3.

These rim members 22 and 22' are preferably shaped to seat on the respective shoulders and to extend over the outer extremity of the flange 23 in abutment with the respective side faces of the flange, the rim 22 having an outwardly opening, peripheral, cable groove 24, while the rim 22' has a similar cable groove 24' of somewhat different dimensions for a cable of a different size.

Each of the rim members 22 and 22' is of substantially circular shape, taking the form of a split ring, cut radially, as seen at 26 in FIGURE 1, and also having radially inwardly extending slots or notches, such as those indicated at 28, which may be conveniently located at 90° intervals about the periphery of the member to render the member somewhat flexible, whereby the member may be readily fitted on the inner rim of the wheel.

The rim members 22 and 22' are each separately secured to the inner rim 21, as by means of bolts 36 and 38 which extend through openings therein from opposite sides of the flange 23 at an angle to the central plane of the wheel, and are threaded into internally threaded openings 35 and 37 of the members to clamp the members on the seats 25 and 27 and against the side faces of the flange. By this arrangement, it will be apparent that the rim members 22 and 22' may be adjusted by tightening or loosening of the bolts 36 and 38 to somewhat expand or contract the members to vary the effective diameters of the members, to thereby adjust the circumferences of the members to accurately measure the length of the cables which is measured. Such expansion and contraction of the members may readily take place, due to the split 36 and the notches or slits 28 which render the members somewhat flexible. Due to the angular arrangement of the bolts 36 and 38, relative to the general plane of the wheel 21, the bolts may readily be reached for adjustment.

Suitable means, such as sheet metal shims, not shown, may be inserted between the members 22 and 22' and their respective seats or shoulders 25 and 27 to securely hold the members in any desired condition of adjustment.

By this arrangement rim members having variously shaped grooves to fit cables of different diameters may be provided on a single wheel so that the wheel may be used without removal and replacement of the rims for accurate measurement of the length of cables of different diameters. The grooves of such rim members may be of such shape and depth that the effective measuring diameter of the wheel may be adjusted to measure the same length of cables of different diameters when the rims are accurately adjusted on the wheel. Thus in carrying out operations in which it may be necessary or desirable to change from a cable of one diameter to another of a different diameter, the change can readily be made, without the necessity of changing wheels, by merely substituting one cable for another, while maintaining the mechanism in condition for the accurate measurement of the length of the cable which is employed.

The tension or weight measuring means of the mechanism includes pairs of pivotally mounted levers or bell cranks, such as the levers 42, 42, shown in FIGURE 1, each of which is pivotally mounted on a pin 46 on the base 12. Each of the levers 42 has arms 48 upon which grooved pulleys 50 are rotatably mounted at locations to engage the cables to hold the cables in contact with the rims. Each lever also has another arm 52, and between the arms 52 of the levers a diaphragm casing 56 is located. The casing 56 may conveniently be formed with a central, ring-like part 62 positioned between flexible diaphragms 58 and 60 to form a pressure chamber therebetween, and outer parts 64 and 66, one at each side of the part 62 in contact with the diaphragms to clamp the diaphragms in the casing. The parts 62, 64 and 66 may be secured together in any convenient manner, as by bolts 68. The chamber formed between the diaphragms is filled with a suitable liquid, such as oil, and a pipe 70 leads from the interior of the oil chamber to a pressure gauge 72 by which the pressure of the liquid may be indicated.

The diaphragms have central pins or lugs 74 against which the arms 52 press to flex the diaphragms toward each other in response to movements of the pulley 50 away from the wheel to apply pressure to the fluid between the diaphragms upon an increase in the pull exerted on the cable, which will then be indicated on the gauge or meter 72.

An adjusting screw 76 may be provided on one of the pins 74, as shown in FIGURE 1, by which the diaphragm mechanism may be adjusted for the purpose of calibrating the tension indicator.

In making use of the mechanism, constructed as described herein, a cable C is positoned in the groove of one of the outer rim members, such as the member 22 and is extended beneath the corresponding pulleys 50 in grooves thereof to yieldingly urge the cable into a flexed condition in engagement with the rim and pulleys. The cable is thus held in a somewhat flexed condition along a portion of the periphery of the rim member 22 by the pulleys, so that upon an increase in the pull exerted on the cable the cable will tend to straighten, thus moving the pulleys further apart and away from the wheel to actuate the levers 42 and 44 to exert an increased pressure on the diaphragms 58 and 60, which will be indicated by the meter 72.

The cable being in engagement with the bottom of the groove 24 will, of course, be measured by rotation of the wheel. Suitable counter mechanism, such as that shown at 76 in FIGURE 1, may be carried on the support arm 14, and connected to the shaft 20 to be driven by rotation of the wheel to indicate the length of the cable which has been measured thereby. The shaft 20 may, of course, be suitably connected to other indicating means, as by means of a right angle drive, such as that indicated at 78, by which electrical mechanism, or the like, of conventional design, shown at 80, may be utilized to indicate the length of cable measured at some location remote from the mechanism.

In the event that the mechanism is to be used for the measurement of a cable of a different size, such as that seen at C' in FIGURE 3, the cable C may be readily removed from the rim member 22 by lifting the pulleys 50 from the dotted line positions illustrated in FIGURE 1, to the solid line positions indicated in that figure, there being sufficient lost motion provided in the levers 42 for this purpose, and the cable C' then slipped into place in the groove 24' of the rim member 22'.

The rim members 22 and 22' will, of course, have been properly adjusted beforehand by adjustment of the bolts or screws 36 and 38 to accurately measure the lengths of the two cables.

It will be noted that either of the cables C or C' may be removed and replaced by the other, without disassembling or dismantling the mechanism and without any need for readjustment of the parts.

The invention thus provides length and weight indicating mechanism for cable apparatus which is accurate in use, which can be easily adjusted and calibrated and wherein cables of different diameters may be interchangeably used without readjustment of the mechanism. The invention therefor, provides a convenient means for facilitating the use of cables of different sizes in the carrying out of cable operations without interference with the accuracy of measurement of the length of cable in use or the pull which is exerted thereon.

Having thus clearly shown and described the invention, what is claimed as new and desired to secure by Letters Patent, is:

1. In a cable length and tension measuring mechanism
   (a) a supporting frame,
   (b) a wheel rotatably mounted on the frame, (c) means forming spaced apart parallel, radially outwardly facing peripheral seating surfaces on the wheel, (d) an expansible peripherally grooved split-ring shaped rim member surrounding each of said surfaces, (e) independently operable means positioned for coaction with said wheel wheel and each of said members to hold each member in a predetermined position of expansion on the wheel, (f) bell crank levers rotatably mounted on the frame and having (g) arms positioned for movement toward and away from the wheel and (h) other arms movable toward and away from each other, (i) a pulley rotatably mounted on each of the first named arms for each of said members for swinging movement with said first named arms in the plane of the member at locations for engagement with a cable passing over the member in the groove thereof to flex the cable upon movement of the first named arms toward the wheel, said first named arms being movable away from the member upon an increase in the tension on the cable to move said other arms toward each other, and (k) tension indicating means positioned for coaction with said other arms upon movement of said other arms toward each other to indicate the tension on said cable.

2. The cable length and tension measuring mechanism as claimed in claim 1, wherein said means forming said seating surfaces includes (1) a radially extending, peripheral flange on said wheel.

3. The cable length and tension measuring mechanism as claimed in claim 2 wherein said flange is formed with an annular radially outwardly facing peripheral face and each of said members has a side face positioned for engagement with one side surface of said flange and a side portion shaped to extend over said peripheral face.

4. The cable length and tension measuring mechanism as claimed in claim 1 wherein the grooves of said members are of different widths.

5. The cable length and tension measuring apparatus as claimed in claim 1, wherein each of said members is formed with (m) peripherally spaced, radially extending slots extending partially through the member from one peripheral face thereof to increase the flexibility of the member.

References Cited

UNITED STATES PATENTS

| 1,901,962 | 3/1933 | Greene | 73—144 XR |
| 2,081,665 | 5/1937 | Greene | 73—144 |
| 2,183,817 | 12/1939 | Mathey | 73—144 |
| 2,328,658 | 9/1943 | Mathey | 73—144 |

CHARLES A. RUEHL, Primary Examiner

U.S. Cl. X.R.

33—134; 74—230.5